United States Patent Office 3,583,859
Patented June 8, 1971

3,583,859
METHOD AND APPARATUS FOR CONTAINING OF MOLTEN METAL IN A GLASS SHEET FLOAT APPARATUS
Jack Lawrenson, Windle, St. Helens, Lancashire, and Albert Sidney Robinson, Birkdale, Southport, Lancashire, England, assignors to Pilkington Brothers, Limited, Liverpool, England
Continuation-in-part of abandoned application Ser. No. 508,357, Nov. 17, 1965. This application May 26, 1969, Ser. No. 827,823
Claims priority, application Great Britain, Dec. 24, 1964, 52,396/64
Int. Cl. C03b 18/02
U.S. Cl. 65—32    4 Claims

ABSTRACT OF THE DISCLOSURE

Gaseous accumulations are avoided on the refractory blocks of the tank structure supporting a bath of molten metal along which glass is advanced in the float process for the manufacture of flat glass, by applying a negative pressure to a restricted interspace surrounding the refractory blocks and sealing off the headspace from the interspace to intercept direct gas flow from the headspace into the interspace.

CROSS REFERENCES TO RELATED APPLICATIONS

This application is a continuation-in-part to our copending application Ser. No. 508,357 filed Nov. 17, 1965, now abandoned.

BACKGROUND OF THE INVENTION

This invention relates to the containing of molten metal and more especially to containing structures for molten metal, for example in glass manufacturing processes and apparatus therefor during which glass is brought into contact with a bath of molten metal.

Industrial processes are well known in which molten glass is fed on to a bath of molten metal and a ribbon of glass developed on the bath from the molten glass supplied to the bath. It is also known to improve the surfaces of a rolled ribbon of glass by delivering the cast ribbon on to a bath of molten metal so that surface imperfections of the ribbon are flowed out by restricted surface melting of the ribbon as it is advanced along the bath.

Tin is generally employed in constituting the bath of molten metal and alloys of tin having a greater specific gravity than the glass and in which tin predominates have also been employed. Tin is a very expensive metal and many tons are employed in constituting the bath. Also tin is readily oxidised at the high temperatures in which it is used, e.g. 1000° C. and has to be protected from effects of furnace gases of glass melting furnaces. To protect the tin a plenum of a protecting gas is maintained within a roof structure over the bath to prevent ingress of atmospheric air or other gases which can be harmful to the tin.

The refractory structure used to contain the molten bath, in the processes referred to, may be constituted by assembling blocks of refractory material arrayed in close juxtaposition, and to allow for expansion of the blocks they are so assembled that interstices exist between them. The molten bath contained by the structure so erected produces an interface where the bath lies against the refractory walls i.e. the side and end walls and the floor of the structure.

In operation there may be a tendency for gases to collect in the interstices between abutting blocks, resulting in an accumulation of gases in the interstices, and a pressure build up may occur in the interstices so that these gases then rise and move in to areas of progressively higher temperatures, so that their volumes increase as they traverse the interstices and ultimately find a way into the tin/refractory interface and spread into the tin in the form of bubbles.

A main object of the present invention is to rid the refractory walls of the gaseous formations wherever they may occur, as an insurance against entry of bubbles into the molten metal bath.

SUMMARY

The present invention involves a method of using a structure containing a molten metal bath having a headspace in which a plenum of protecting gas is maintained and having a support structure of abutting refractory blocks in which the molten metal bath is contained and with interstices between juxtaposed surfaces of the blocks in communication with a common restrictive interspace defined by said refractory blocks and an enveloping shell, which method includes sealing off the headspace from the interspace and applying a negative pressure to the interspace and to the interstices communicating therewith whereby to insure against entry of bubbles from said interstices into the molten metal bath.

DESCRIPTION OF THE PREFERRED EMBODIMENTS

Figure 1:
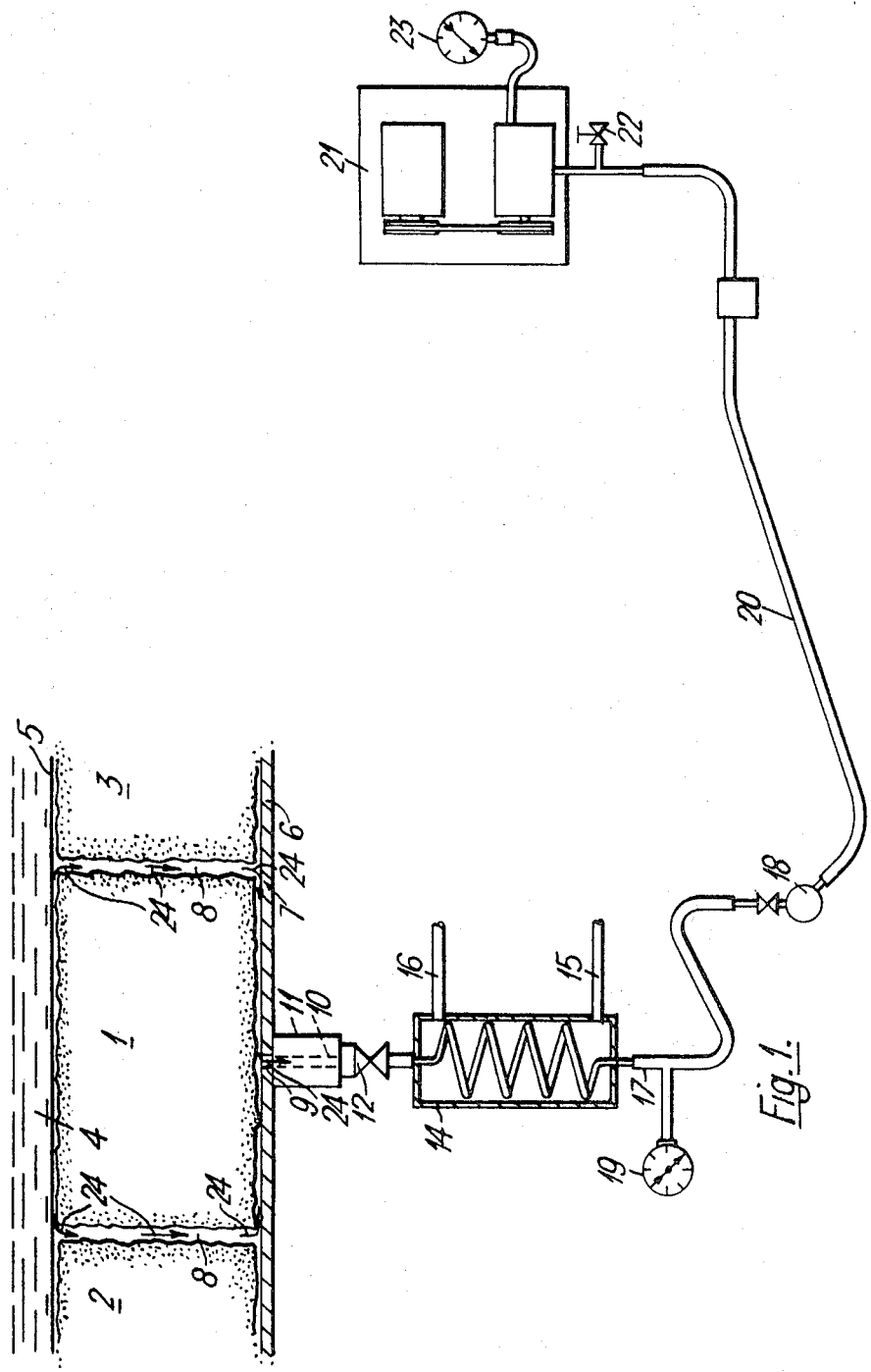
FIG. 1 illustrates diagrammatically apparatus for preventing gaseous formations in interstices at the joints between abutting refractory blocks assembled to constitute a containing structure for a bath of molten metal.

Referring to FIG. 1 of the drawings, adjacent refractory blocks forming part of the bottom wall or floor of a tank structure are indicated at 1, 2 and 3, which tank structure contains a bath of molten metal indicated at 4. The molten metal bath has the characteristics fully described in U.S. Pat. No. 2,911,759. The lower plane surface of the bath is indicated at 5 and the tank structure is formed of juxtaposed blocks of refractory material, and is of elongated rectangular form. The whole tank structure is enclosed by a metal shell, for example of welded steel sheet, of which a part of the shell lies in contiguity with the floor of the tank structure as indicated at 6. A restricted interspace indicated at 7 is provided between the relatively smooth inner surface of the metal and the rough outer surfaces of the juxtaposed refractory blocks.

Between the floor refractories exemplified at 1, 2 and 3 and the bath 4, is an interface of large surface area in which the plane molten face 5 at the bottom of the bath lies in contact with the inner relatively rough faces of the blocks 1, 2 and 3. The usual interstices 8, 8 of relatively small volume between refractory blocks such as 1, 2 and 3 are greatly exaggerated for the sake of clarity.

All the walls of the tank structure, that is the side walls, the two end walls and the floor, are formed of adjoining refractory blocks and the whole tank structure is encased in the shell of welded steel sheet.

The shell 6 is apertured as indicated at 9 to form the entry to a duct 10 in a bushing 11 secured e.g. by welding to the shell 6. At the outer end of the bushing is mounted a valve 12 which controls gas flow through the duct 9 into a heat exchanger coil 13 mounted on a housing 14, through which a cooling medium, preferably water, is continually circulated in contraflow via an inlet 15 and outlet 16. Any molten metal of the bath which finds its way into the interspace and through the outlet 9 is solidified and caught in the heat exchanger.

The heat exchanger flow pipe 13 is connected to a branch 17 leading to a manifold 18 to which manifold a plurality of ducts 9 in the shell 6 leading out of the interspace 7 is connected. Each branch may have a vacuum gauge 19.

The manifold 18 is connected by piping 20 to a vacuum pump indicated at 21. The line 20 may have a bleed valve 22 as indicated and a vacuum gauge 23. Several manifolds each with branches leading to the interspace 7 may be connected with pumps to ensure uniformity of the negative pressure in the interspace.

Exactly similar arrangements may be erected outside the side walls and end walls (not shown) of the tank structure in order that the interface surrounding the bath will in turn be surrounded by interspace 7.

In operation the pump applies a negative pressure to the interspace 7 and thence to the interstices 8, which may in some instances be partially filled by molten metal extending down into the interstices as indicated at 25. In other instances the negative pressure may be applied through the interstices 8 to the interface where the plane face 5 of the bath and the relatively rough faces of the blocks such as 1, 2 and 3 meet. The negative pressure at the interface is always sufficient to engender migration of gas from the interface into interspace 7 as shown by arrows 24 and thence into extracting system 10, 13, 17, 18 and 20 of the pump system.

The apparatus described prevents the formation of any bubbles so that aeration of the molten metal is prevented and ensuing arrival of bubbles at the interface between the ribbon of glass and the bath prevented.

Where a protective atmosphere is maintained at a plenum in the headspace defined over the containing structure some gas from the headspace might reach the interspace between the metal casing and the refractory blocks by downward gas flow from the headspace to the interspace for example through the porous refractory blocks.

Figure 2:
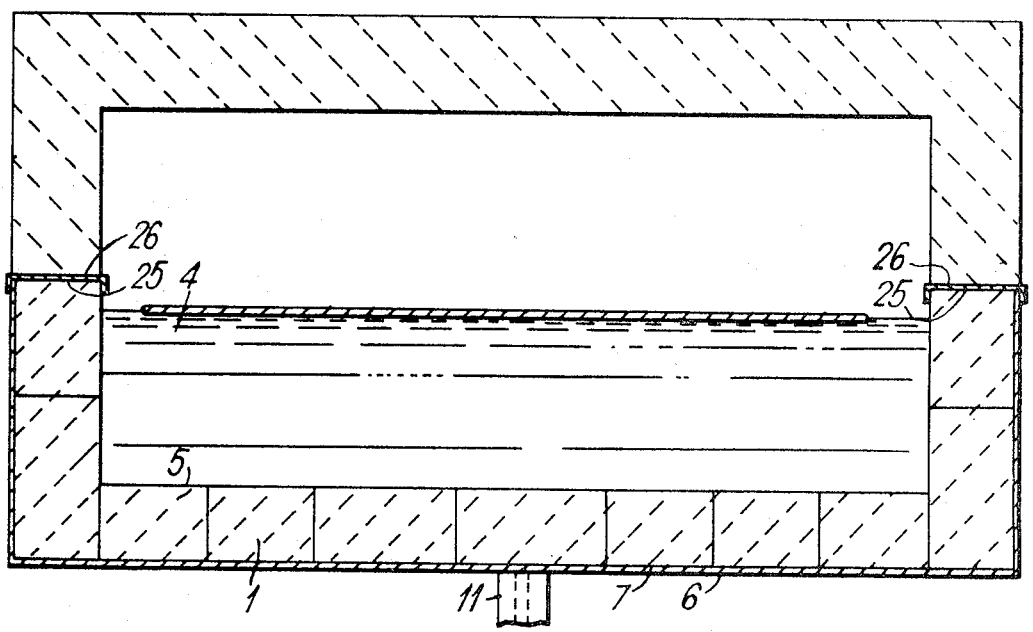
FIG. 2 is a vertical transverse cross-section through the containing structure illustrated in FIG. 1.

Such direct gas flow from the headspace into the interspace is intercepted as illustrated in FIG. 2 by facing the top edges 25 of the tank structure with metal plates 26, or by employing a suitable sealing medium in place of the metal plates 26 at the top edges of the tank structure, to seal any passages through the top surfaces of the tank side and end walls.

In the foregoing description reference is made to an elongated tank structure containing a bath of molten metal and the protection of the molten metal against aeration and contamination during the production of glass in ribbon form on a bath of molten metal, either by manufacturing the ribbon on the bath or by improving the surfaces of a rolled ribbon fed on to the bath.

The use of the invention, however, is not limited to this field of operation, but the invention can be used in any glass manufacturing process during which the glass is brought into contact with a bath of molten metl.

We claim:
1. In the operation of a float glass manufacturing apparatus having a container structure for a bath of molten metal which has walls of abutting refractory blocks with interstices between adjacent faces thereof and which is enveloped in a shell, and said apparatus having also a roof for the container structure including refractory blocks defining an enclosed headspace above the molten metal bath, the steps which include advancing a ribbon of glass along and while supported on said molten metal bath, maintaining a plenum of protective gas in the headspace above said molten metal bath, applying a negative pressure to the interspace and to the interstices communicating therewith whereby to insure against entry of bubbles from said interstices into the molten metal bath, and impermeably sealing off the wall structure throughout substantially the width thereof at a level adjacent the level of the molten bath substantially to deny access to the inersties in the walls of the container structure, of plenum gases otherwise drawn from the headspace through the refractory blocks of the roof.

2. A method according to claim 1, wherein the negative pressure applied is from ¼ inch to 7 inches water gauge below atmospheric pressure.

3. A float glass manufacturing apparatus comprising walls of abutting refractory blocks having interstices between juxtaposed faces thereof and forming a container for a bath of molten metal having a surface on which a ribbon of glass is supported during manufacture, a roof over the container having a lining of refractory blocks defining an enclosed headspace above the metal bath for containing a plenum of protecting gas for the molten metal, a shell enveloping the refractory block container and defining therewith a restricted interspace in communication with the interstices between the blocks, means including an external pumping system communicating with the interspace through said shell for exhausting gases from the interspace and from the interstices communicating therewith, and gas impermeable means extending across the width of said walls substantially at the level of the molten metal in the bath and forming a barrier to the withdrawal of plenum gas through said refractory roof lining into the zone affected by the pumping system.

4. Apparatus according to claim 3, wherein the pumping system includes a heat exchanger in which molten metal withdrawn from the interspace is solidified.

References Cited

UNITED STATES PATENTS

| | | | |
|---|---|---|---|
| 3,250,061 | 5/1966 | Brotzmann | 266—34VX |
| 3,428,444 | 2/1969 | Swillinger | 65—65AX |
| 3,334,983 | 8/1967 | Badger et al. | 65—182 |

FOREIGN PATENTS

| | | | |
|---|---|---|---|
| 1,096,538 | 1/1961 | Germany | 266—34 |

ARTHUR D. KELLOGG, Primary Examiner

U.S. Cl. X.R.

65—65, 99, 182; 266—34